US009804753B2

(12) United States Patent
Ramsby et al.

(10) Patent No.: US 9,804,753 B2
(45) Date of Patent: Oct. 31, 2017

(54) SELECTION USING EYE GAZE EVALUATION OVER TIME

(71) Applicant: Microsoft Technology Licensing, LLC, Redmond, WA (US)

(72) Inventors: Scott Ramsby, Kirkland, WA (US); Tony Ambrus, Seattle, WA (US); Michael Scavezze, Bellevue, WA (US); Abby Lin Lee, Seattle, WA (US); Brian Mount, Seattle, WA (US); Ian Douglas McIntyre, Redmond, WA (US); Aaron Mackay Burns, Newcastle, WA (US); Russ McMackin, Kirkland, WA (US); Katelyn Elizabeth Doran, Seattle, WA (US); Gerhard Schneider, Seattle, WA (US); Quentin Simon Charles Miller, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/221,147

(22) Filed: Mar. 20, 2014

(65) Prior Publication Data
US 2015/0268821 A1 Sep. 24, 2015

(51) Int. Cl.
G06F 3/0484 (2013.01)
G06F 3/01 (2006.01)
(Continued)

(52) U.S. Cl.
CPC .......... *G06F 3/04842* (2013.01); *G06F 3/013* (2013.01); *G06F 3/048* (2013.01);
(Continued)

(58) Field of Classification Search
CPC ..... G06F 3/013; G06F 3/012; G02B 23/0125; H04N 13/0429–13/044; H04N 5/7491
(Continued)

(56) References Cited

U.S. PATENT DOCUMENTS 4,836,670 A  6/1989  Hutchinson
5,844,544 A * 12/1998 Kahn ................... G06F 3/0236
                                              345/156
(Continued)

FOREIGN PATENT DOCUMENTS

WO       2013082760 A1     6/2013

OTHER PUBLICATIONS

Valenti, Roberto et al., "Combining Head Pose and Eye Location Information for Gaze Estimation", In IEEE Transactions on Image Processing, vol. 21, Issue 2, Feb. 2012, 14 pages.
(Continued)

*Primary Examiner* — Priyank Shah
(74) *Attorney, Agent, or Firm* — Alleman Hall Creasman & Tuttle LLP

(57) ABSTRACT

Various embodiments relating to selection of a user interface object displayed on a graphical user interface based on eye gaze are disclosed. In one embodiment, a selection input may be received. A plurality of eye gaze samples at different times within a time window may be evaluated. The time window may be selected based on a time at which the selection input is detected. A user interface object may be selected based on the plurality of eye gaze samples.

20 Claims, 6 Drawing Sheets

(51) Int. Cl.
*G06F 3/0488* (2013.01)
*G06F 3/048* (2013.01)
*G06F 3/0482* (2013.01)
*G06K 9/00* (2006.01)

(52) U.S. Cl.
CPC ........ *G06F 3/0482* (2013.01); *G06F 3/04883* (2013.01); *G06K 9/00604* (2013.01)

(58) Field of Classification Search
USPC ....... 345/156, 173, 174, 175, 176, 177, 178, 345/104, 204
See application file for complete search history.

(56) References Cited

U.S. PATENT DOCUMENTS

| | | | |
|---|---|---|---|
| 6,118,888 A | 9/2000 | Chino et al. | |
| 2005/0243054 A1 | 11/2005 | Beymer et al. | |
| 2007/0024579 A1* | 2/2007 | Rosenberg | 345/156 |
| 2007/0040799 A1 | 2/2007 | Singh et al. | |
| 2007/0135982 A1* | 6/2007 | Breed | B60J 10/00 701/36 |
| 2011/0298702 A1* | 12/2011 | Sakata | G06F 3/013 345/156 |
| 2012/0173999 A1 | 7/2012 | Invernizzi | |
| 2012/0272179 A1 | 10/2012 | Stafford | |
| 2013/0169560 A1 | 7/2013 | Cederlund et al. | |
| 2013/0196757 A1 | 8/2013 | Latta et al. | |
| 2013/0300636 A1* | 11/2013 | Cunningham et al. | 345/8 |
| 2013/0304479 A1* | 11/2013 | Teller | G06F 3/013 704/275 |
| 2013/0314303 A1* | 11/2013 | Osterhout | G06F 3/005 345/8 |
| 2014/0002352 A1* | 1/2014 | Jacob et al. | 345/156 |
| 2014/0049452 A1* | 2/2014 | Maltz | 345/8 |
| 2014/0055342 A1* | 2/2014 | Kamimura | G06F 3/013 345/156 |
| 2014/0168056 A1* | 6/2014 | Swaminathan | G06K 9/00604 345/156 |
| 2014/0222558 A1* | 8/2014 | Spivack | G06Q 30/0643 705/14.51 |
| 2014/0253876 A1* | 9/2014 | Klin et al. | 351/210 |
| 2016/0342205 A1* | 11/2016 | Shigeta | A61B 3/113 |

OTHER PUBLICATIONS

Tonder, Martin Stephen Van, "The Development and Evaluation of Gaze Selection Techniques", In PHD Thesis Submitted in Fulfillment of the Requirements for the Degree of Philosophiae Doctor in the Faculty of Science at the Nelson Mandela Metropolitan University, Apr. 2009, 212 pages.
Ohno, Takehiko, "Features of Eye Gaze Interface for Selection Tasks", In Proceedings of 3rd Asia Pacific Computer Human Interaction, Jul. 15, 1998, 6 pages.
Isokoski, Poika, "Text Input Methods for Eye Trackers Using Off-Screen Targets", In Proceedings of the Symposium on Eye Tracking Research & Applications, Nov. 6, 2000, 7 pages.
ISA European Patent Office, International Search Report and Written Opinion Issued in PCT Patent Application No. PCT/US2015/021121, dated Jun. 10, 2015, WIPO, 13 Pages.
Zhang, Y. et al., "SideWays: A Gaze Interface for Spontaneous Interaction with Situated Displays," Proceedings of the SIGCHI Conference on Human Factors in Computing Systems (CHI 2013), Apr. 27, 2013, Paris, France, 10 pages.
IPEA European Patent Office, International Preliminary Report on Patentability Issued in Application No. PCT/US2015/021121, dated Feb. 23, 2016, WIPO, 9 pages.

* cited by examiner

SELECTION USING EYE GAZE EVALUATION OVER TIME

BACKGROUND

Eye gaze tracking may be used as a mechanism of interaction with a graphical user interface. For example, a location at which a gaze is determined to intersect a graphical user interface may be used as a position signal for the graphical user interface, analogous to that provided by a traditional cursor that is controlled by a computer mouse or the like.

SUMMARY

Various embodiments are disclosed that relate to selection of a user interface object displayed on a graphical user interface based on eye gaze detection. For example, one disclosed embodiment provides a method comprising, on a computing device, receiving a selection input and evaluating a plurality of eye gaze samples at different times within a time window in response to the selection input, wherein the time window may be selected based on a time at which the selection input is detected. The method further comprises selecting a user interface object based on the plurality of eye gaze samples.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Some approaches for using eye gaze tracking to select a user interface object may determine a graphical user interface object to select based on an eye gaze location at the time a selection input (e.g., a button actuation, a body part gesture, etc.) is received. However, such approaches may result in an inaccurate determination of which graphical user interface object to select. For example, when moving quickly between user interface (UI) objects, such as when using eye gaze tracking to type on a virtual keyboard, a user may perform a selection input before the user's eye gaze has settled at the location of an intended UI object. Likewise, the user's eye gaze may settle on an intended UI object and then be moved away before a selection input is performed. Thus, selecting a user interface object based upon the location of gaze at the time the selection input is performed may result in the user interface behavior not matching user intent. System latencies also may contribute to such uncertainties. For example, it may take a longer amount of time to process receipt of a selection input than a determination of eye gaze location, or vice versa. As such, a lag may be produced between eye gaze detection and selection detection independent of any user behavior.

Accordingly, embodiments are disclosed herein that relate to controlling selection of a graphical user interface object by evaluating a plurality of eye gaze samples. For example, in some embodiments, eye gaze position measurements may be periodically sampled and stored for an amount of time. Upon receipt of an input configured to select a UI object, a plurality of eye gaze samples within a time window may be evaluated to determine which UI object the user intended to select. By evaluating a plurality of eye gaze samples near the time at which the selection input is detected, more data may be taken into account when determining the intended UI object than when considering a single sample. This may help determine the intended UI element even when an intended eye gaze location is not synchronized with a selection input.

Figure 1:
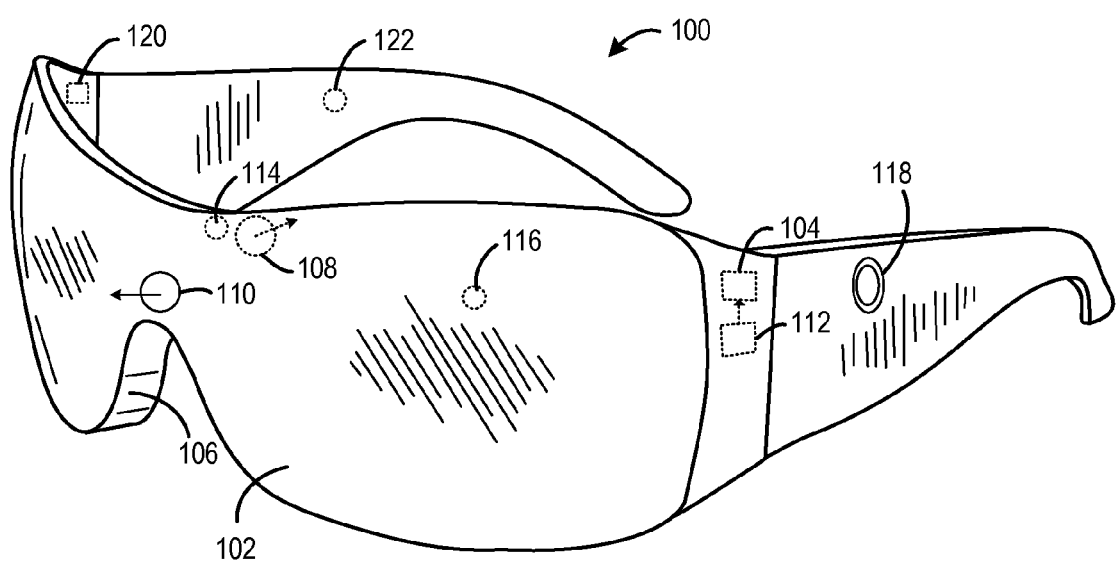
FIG. 1 shows an example of a head-mounted display device according to an embodiment of the present disclosure.

The embodiments described herein may be used with any suitable gaze tracking system. For example, in some embodiments, eye gaze tracking may be used to control a graphical user interface displayed on a head-mounted display (HMD) device. FIG. 1 shows a non-limiting example of an HMD device 100 in the form of a pair of wearable glasses with a transparent display 102. It will be appreciated an HMD device may take any other suitable form in which a transparent, semi-transparent, and/or non-transparent display is supported in front of a viewer's eye or eyes. Further, embodiments described herein may be used with any other suitable eye tracking system, including but not limited to eye tracking systems for mobile computing devices, laptop computers, desktop computers, tablet computers, other wearable computers, etc.

The HMD device 100 includes a see-through display 102 and a controller 104. The see-through display 102 may enable images such as holographic objects to be delivered to the eyes of a wearer of the HMD device. The see-through display 102 may be configured to visually augment an appearance of a real-world, physical environment to a wearer viewing the physical environment through the transparent display. For example, the appearance of the physical environment may be augmented by graphical content that is presented via the transparent display 102 to create a mixed reality environment. In one example, the display may be configured to display one or more UI objects on a graphical user interface. In some embodiments, the UI objects presented on the graphical user interface may be virtual objects overlaid in front of the real-world environment. Likewise, in some embodiments, the UI objects presented on the graphical user interface may incorporate elements of real-world objects of the real-world environment seen through the transparent display 102. In either case, the UI objects may be selected via eye gaze tracking.

Any suitable mechanism may be used to display images via transparent display 102. For example, transparent display 102 may include image-producing elements located within lenses 106 (such as, for example, a see-through Organic Light-Emitting Diode (OLED) display). As another example, the transparent display 102 may include a light modulator located within a frame of HMD device 100. In this example, the lenses 106 may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating a mixed reality environment.

The HMD device 100 may also include various sensors and related systems to provide information to the controller 104. Such sensors may include, but are not limited to, one or more inward facing image sensors 108, one or more outward facing image sensors 110, and an inertial measurement unit (IMU) 112. The one or more inward facing image sensors 108 may be configured to acquire image data in the form of gaze tracking data from a wearer's eyes. The HMD device may be configured to determine gaze directions of each of a wearer's eyes in any suitable manner based on the information received from the image sensors 108. For example, one or more light sources 114, such as infrared light sources, configured to cause a glint of light to reflect from the cornea of each eye of a wearer. The one or more image sensors 108 may then be configured to capture an image of the wearer's eyes. Images of the glints and of the pupils as determined from image data gathered from the image sensors 108 may be used by the controller 104 to determine an optical axis of each eye. Using this information, the controller 104 may be configured to determine a direction the wearer is gazing. The controller 104 may be configured to additionally or alternatively determine at what physical or virtual object the wearer is gazing.

The one or more outward facing image sensors 110 may be configured to receive physical environment data from the physical environment in which the HMD device 100 is located. For example, the outward facing sensors 110 may be configured to detect movements within a field of view of the display 102, such as gesture-based inputs or other movements performed by a wearer or by a person or physical object within the field of view. In one example, the outward facing sensors 110 may detect a selection input performed by the wearer of the HMD device, such as a gesture (e.g., a pinching of fingers, closing of a fist, etc.), that indicates selection of a UI object displayed on the display device. The outward facing sensors may also capture 2D image information and depth information from the physical environment and physical objects within the environment. The controller 104 may be configured to use such environmental information to determine direction/location and orientation data that enables position/motion tracking of the HMD device 100 in the real-world environment.

The IMU 112 may be configured to provide position and/or orientation data of the HMD device 100 to the controller 104. In one embodiment, the IMU 112 may be configured as a three-axis or three-degree of freedom position sensor system. This example position sensor system may, for example, include three gyroscopes to indicate or measure a change in orientation of the HMD device 100 within 3D space about three orthogonal axes (e.g., x, y, z) (e.g., roll, pitch, yaw). The orientation derived from the sensor signals of the IMU may be used to display, via the see-through display, one or more virtual UI objects in three degrees of freedom.

In another example, the IMU 112 may be configured as a six-axis or six-degree of freedom position sensor system. Such a configuration may include three accelerometers and three gyroscopes to indicate or measure a change in location of the HMD device 100 along the three orthogonal axes and a change in device orientation about the three orthogonal axes. In some embodiments, position and orientation data from the image sensor 110 and the IMU 112 may be used in conjunction to determine a position and orientation of the HMD device 100.

The HMD device 100 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

Continuing with FIG. 1, the controller 104 may be configured to record multiple eye gaze samples over time based on information detected by the one or more inward facing image sensor 108. For each eye gaze sample, eye tracking information and, in some embodiments, head tracking information (from image sensors 110 and/or IMU 112) may be used to estimate an origin point and a direction vector of that eye gaze sample to produce an estimated location at which the eye gaze intersects the see-through display. Non-limiting examples of eye tracking information and head tracking information used to determine an eye gaze sample may include an eye gaze direction, head orientation, eye gaze velocity, eye gaze acceleration, change in angle of eye gaze direction, and any other suitable tracking information. In some embodiments, eye gaze tracking may be recorded independently for both eyes of the wearer of the HMD device 100.

Furthermore, in some embodiments, the controller 104 may be configured to evaluate eye gaze samples compared to a stability metric. For example, the stability metric may consider various parameters including velocity, acceleration, and other eye gaze tracking information. Sample stability may be evaluated, for example, based on statistical variance of eye gaze direction of samples within a time window. The time window may be selected based on a time at which a selection input is detected. Samples that do not meet the stability metric may have a higher potential of providing an inaccurate representation of eye gaze location, and thus may be excluded from evaluations of eye gaze samples for selection of a UI object. For example, an eye gaze sample having a high velocity and/or acceleration may indicate that the eye gaze is unstable or not settled at a particular location, and thus the sample may not be considered in an evaluation of selection of a UI object.

Additionally, in some embodiments, contextual information that may indicate user intent may be considered in the calculation of the stability heuristic. For example, when selecting characters on a virtual keyboard, past chosen characters may be considered for valid word prefixes. In another example, editing functions may be considered as contextual information. For example, if a character on a virtual keyboard is selected and then deleted, then that character may not be considered for the next selection event.

It will be understood that the time window may be set to any suitable position relative to the time of the selection input and may have any suitable duration without departing from the scope of the present disclosure. For example, in some embodiments, the time window may have a relatively limited duration and include a limited number of eye gaze samples surrounding the time of the selection input. In other embodiments, the time window may comprise an entire time duration that the HMD device is turned on and collecting eye gaze samples. For example, the eye gaze samples in this time window may be evaluated according to an exponential smoothing approach.

A plurality of eye gaze samples may be evaluated in any suitable manner to determine a UI object intended for selection. For example, in some embodiments, eye gaze sample evaluation may follow an iterative heuristic that starts with an eye gaze sample nearest to a time at which the selection input is detected. Samples may be iteratively evaluated moving outwards in time, both forward and back from the time at which the selection input is detected. In one example, if a sample being evaluated differs from an average direction of gaze samples in a time window beyond a threshold, such as a particular percentage difference, the evaluation of samples in that direction in time may be stopped. In another example, if multiple consecutive samples in a direction vary by a significant amount, then the evaluation of samples in that direction in time may be stopped. Such variance may indicate a boundary between discrete user actions.

The selection input may include any suitable action performed by the wearer of the HMD device 100 to indicate selection of a UI object displayed on the see-through display 102. For example, in some embodiments, a selection input may be made via an input mode other than eye gaze. As a more specific example, the selection input may be made via a selection input button 118 located on the HMD device 100. In another example, a selection input button may be located on another device, such as a remote controller in communication with the HMD device 100. In yet another example, the selection input may be made via a gesture performed by the wearer of the HMD device, wherein the gesture may be detected via the optical sensor system, the head tracking system, and/or any other suitable sensor or sensors. For example, the gesture may include closing of fingers on a hand to make a fist. As another example, the gesture may include a sudden change in head movement. In particular, a wearer of the HMD device may move his/her head in one direction, and then abruptly stop or change direction. The stop and/or change in direction may be recognized as a selection input. In a further example, a selection input may be made via eye movement or an eye wink/blink. In yet a further example, a selection input may be made via speech. It will be understood that the selection input may include any suitable action and may be detected in any suitable manner without departing from the scope of the present disclosure.

The HMD device 100 may also include one or more microphones, such as microphone 120, that capture audio data. Further, audio outputs may be presented to the wearer via one or more speakers, such as speaker 122. In some embodiments, the microphone system may be configured to provide audio feedback indicating selection of a UI object presented on a graphical user interface displayed on the see-through display.

The controller 104 may include a logic machine and a storage machine, as discussed in more detail below with respect to FIG. 8, that may be in communication with the various sensors and display of the HMD device. In one example, the storage machine may include instructions that are executable by the logic machine to receive a selection input, evaluate a plurality of eye gaze samples at different times within a time window selected based on a time at which the selection input is detected, and select a UI object displayed on the see-through display based on the plurality of eye gaze samples.

As discussed above, when a user provides a selection input indicating an intention to select a UI object, a plurality of eye gaze samples within a window of time selected may be evaluated to determine which UI object the user intends to select. The time window may be selected, for example, based on a time at which the selection input is received.

Figure 2:
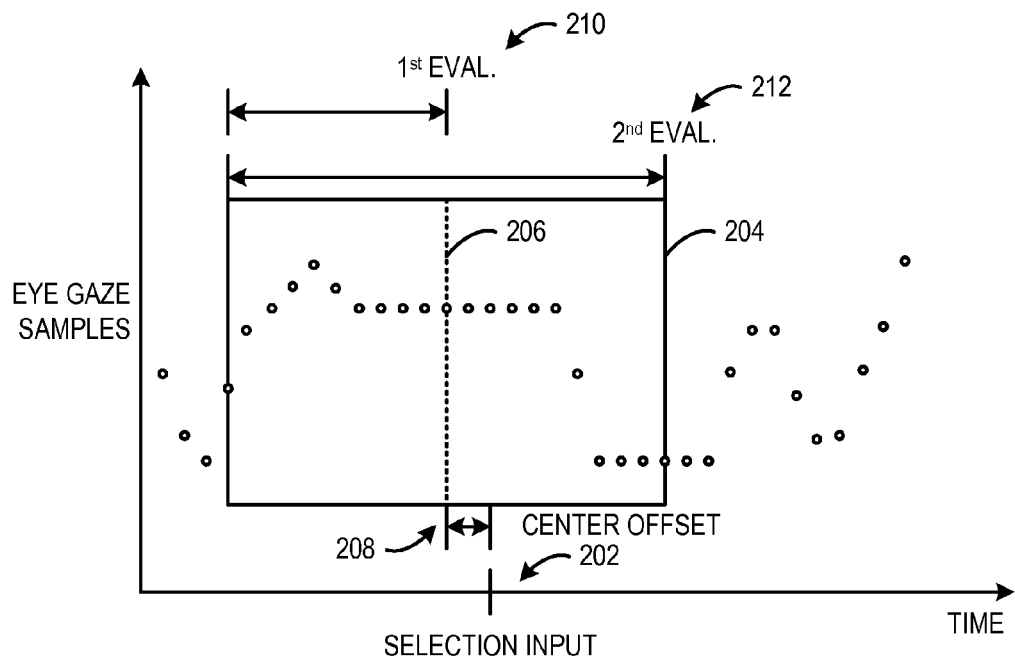
FIGS. 2-3 show graphical depictions of example eye gaze sample evaluations according to embodiments of the present disclosure.
Figure 3:
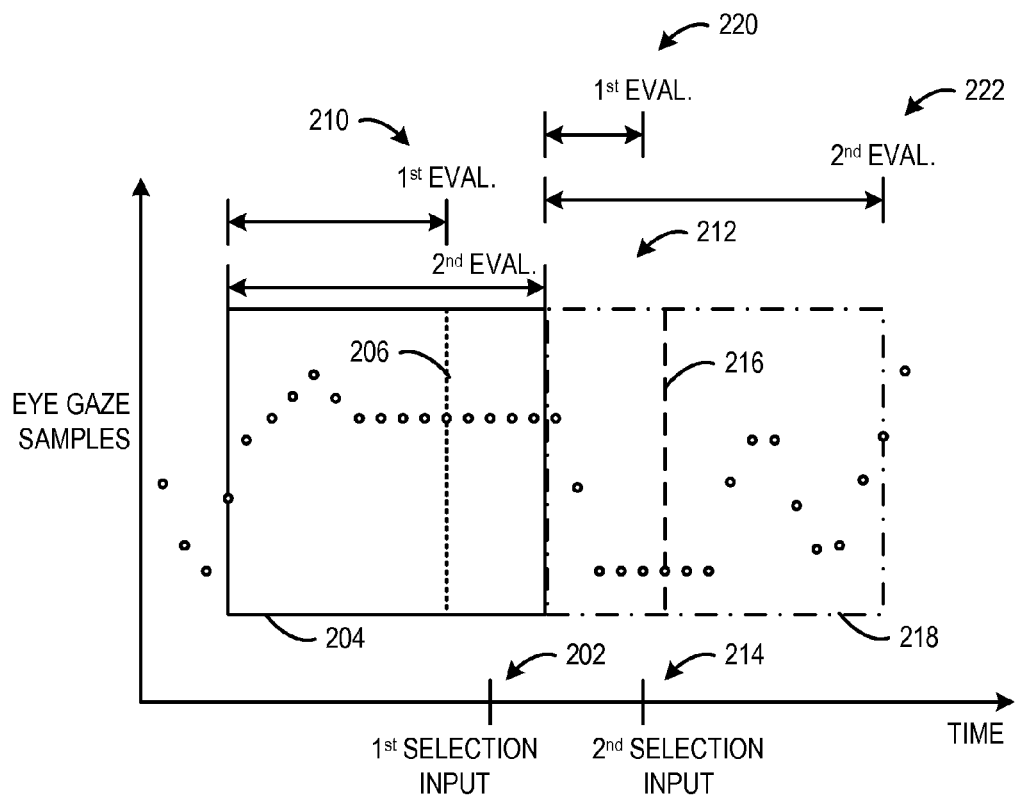

FIGS. 2-3 show graphical representations of example methods of evaluating eye gaze samples within time windows. The eye gaze samples may represent any suitable information used for tracking eye gaze, including but not limited to gaze direction data. First referring to FIG. 2, when a selection event 202 is detected, a time window 204 is defined based on the time at which the selection input is detected. In this example, the time window includes eye gaze samples taken before and after the time at which the selection input 202 is detected, but it will be understood that a time window may be include any suitable time frame.

In some embodiments, a center 206 of the time window 204 may be set to a time prior to receipt of the selection input 202. In FIG. 2, this offset if illustrated at 208. For example, the offset 208 may be adjusted based on a determined amount of time (e.g. from historical data) or estimated amount of time between when a user starts the selection input (e.g., initiate a gesture, push a button, etc.) and when the selection input is received by the system. Where the offset is determined via historical data, the offset may be adjusted over time, for example, as a user becomes more skilled. In other embodiments, the center of the time window may be set at the time of receipt of the selection input.

Upon detection of the selection input 202, a first evaluation 210 of a plurality of eye gaze samples may be performed to determine a UI object that is a most likely target of the selection input. The first evaluation 210 may utilize a plurality of eye gaze samples having times prior to center 206 of the time window. The plurality of eye gaze samples may be evaluated, for example, to determine a combined location at which the plurality of eye gaze samples intersects with a graphical user interface. The term "combined location" may indicate a location determined via any suitable computation utilizing the plurality of eye gaze samples. In one non-limiting example, the combined location may be an average location at which the plurality of eye gaze samples intersect with the graphical user interface.

Based on the first evaluation, a UI object on the graphical user interface may be selected based, for example, upon one or more selection rules applied by the HMD device. As one example, the selection rules may apply a weight to each UI object, and the UI object having the highest weight may be selected. As a more specific example, a UI object that is a nearest UI object to the combined location at which the plurality of eye gaze samples intersect with a graphical user interface may have a highest weight and therefore may be selected. In other words, weighting may be based on a distance from a UI object to the combined location of the eye gaze samples.

As another example, weighting may be based on a distance from a UI object to the combined location of the eye gaze samples multiplied by a logarithm of the UI element size. Such selection rules may provide a bias towards smaller UI objects that may increase selection accuracy. As another example, weighting may be based on a distance from a UI object to the combined location of the eye gaze samples divided by a voice recognition confidence level. For example, a voice input may be compared to a plurality of candidate UI objects to produce a voice recognition confidence level. As yet another example, the selection rules may include a weight component for UI objects most recently interacted with by the wearer. As such, popular UI objects may be given more weight.

In some embodiments, the selection rules may include a tie-breaking provision when multiple UI objects have a same weight. For example, any of the above described examples may be employed as secondary or tie-breaker considerations in the selection rules.

In some embodiments, each UI object may have a dynamically changing "hit target"—an area of the graphical user interface associated with the UI object for the purposes of determining selection. An area of a hit target may change dynamically depending on an expected selection of a UI object. For example, the expected selection may be determined based on context of the application. In one example where UI objects are keys of a virtual keyboard, the expected selection may be based on estimated letters to finish a word or other grammar and spelling based estimations.

By evaluating a plurality of eye gaze samples leading up to detection of the selection input, accurate selection of a UI object may be achieved even in the case where a user's eye gaze leaves the intended UI object prior to providing the selection input.

A second evaluation 212 of a different plurality of eye gaze samples may be performed at a time after the selection input is detected. The second evaluation may include eye gaze samples taken after the time at which the selection input is detected. The second evaluation may be performed to either confirm the selection of the first evaluation or to deselect the selection from the first evaluation and select another UI object based on the additional eye gaze samples taken after the selection input is detected. In particular, the eye gaze samples taken after the selection input is detected may help to identify a scenario in which eye gaze does not settle on an intended UI object until after the selection input is performed. Accordingly, accurate selection of a UI object may be achieved even in the case where a user's eye gaze does not settle on an intended UI object until after providing the selection input.

In some embodiments, the different plurality of eye gaze samples of the second evaluation may include eye gaze samples taken before and after the selection input is detected. In one example, the second evaluation may include all samples within the time window. In other words, eye gaze samples in first window may be considered again in the second window of the same evaluation event. In other embodiments, the second evaluation may exclude some or all of the time samples in the first window.

The second evaluation may either confirm the initial selection determined by the first evaluation or undo the initial selection and result in the selection of a different UI object. For example, if a different UI object is nearest to a combined location at which the different plurality of eye gaze samples intersects the graphical user interface, then the initial selection of the UI object may be undone and the different UI object may be selected.

In some embodiments, upon completion of the secondary evaluation, all eye gaze samples evaluated by the first evaluation and the second evaluation may be ineligible for future evaluations of eye gaze samples. This may prevent accidental double selection of the same UI object when selection inputs are provided close together in time. In other embodiments, eye gaze samples may be considered in multiple evaluation events.

In some embodiments, the first evaluation may evaluate eye gaze samples in a first time window centered at a first time and the second evaluation may evaluate eye gaze samples in a second time window that is centered at a time later than the first time. The second window may include a different plurality of eye gaze samples than the first window.

In some instances, a selection input may be received before evaluations for a prior selection input have been completed. FIG. 3 shows a scenario in which a second selection input 214 is received prior to a time 216 at which the second evaluation of the first selection input 202 is to be performed. In this scenario, the first evaluation 210 of the first selection input 202 takes place in the same manner as described above. However, because the second selection input 214 is detected after the first selection input 202 and prior to the second evaluation of the first selection input 202, a time window of the second evaluation 212 of the first selection input 202 is adjusted to end prior to the time at which the second selection input 214 is received. For example, a duration between the center 206 of the first window 204 and the second selection input 214 may be reduced (e.g., by half or other suitable amount). In this manner, the time window of the second evaluation is shortened.

Upon shortening the second evaluation of the first selection event, a first evaluation 220 of the second selection input 212 may be performed utilizing eye gazes sample from a second window 218. In particular, the eye gaze samples may be taken from a time window starting at the halfway point (or other suitable point) and end at the time at which the second selection input 214 is detected. A second evaluation 222 of the second selection input 214 may include eye gaze samples in the second window 218 indicated by a dot-dashed line. The second evaluation 222 may be performed as described above unless another selection input is detected prior to performing the second evaluation 222.

Figure 4:
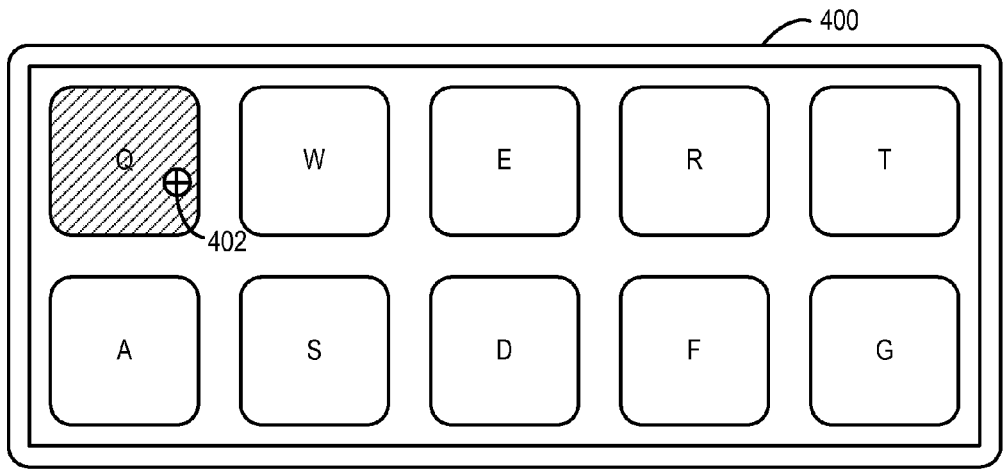
FIGS. 4-6 show examples of feedback that may be presented on a graphical user interface based on eye gaze evaluation in accordance with an embodiment of the present disclosure.
Figure 5:
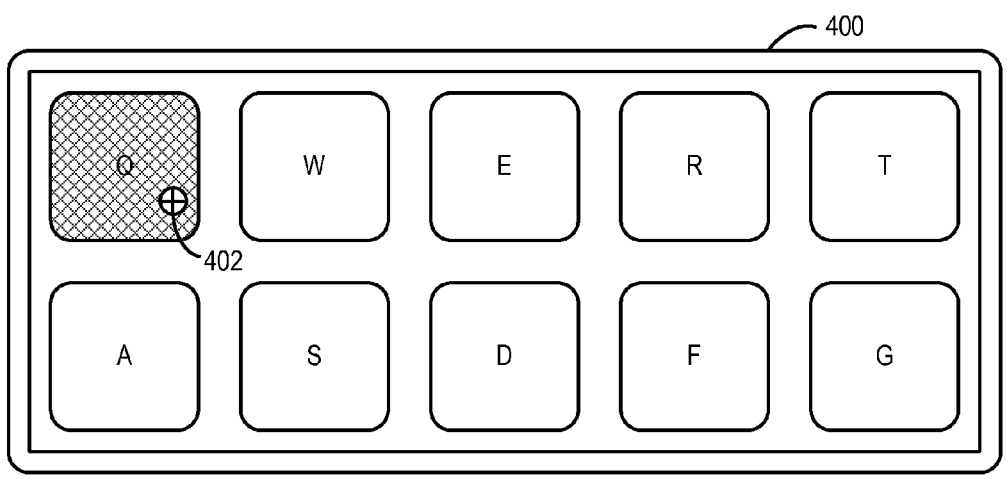
Figure 6:
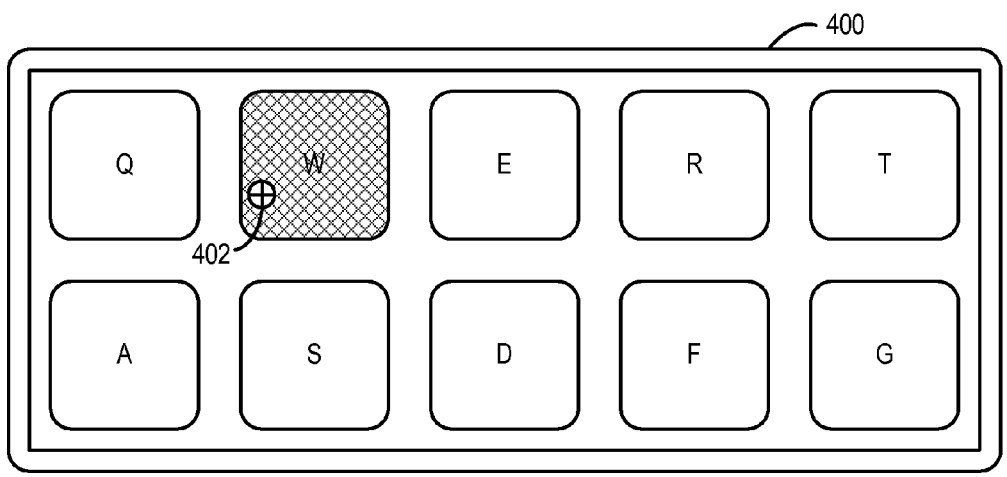

Any suitable feedback may be provided to a user as a user interacts with a user interface via eye gaze. FIGS. 4-6 show non-limiting examples of feedback provided to a user via a graphical user interface 400 as the user selects a UI object via eye gaze according to the embodiments disclosed herein. The graphical user interface 400 is depicted as including plurality of UI objects (e.g., keys of a virtual keyboard). The feedback shown in FIGS. 4-6 is visual, but it will be understood that user feedback may be provided in other forms as well (e.g. audio, haptic, etc.).

First, in FIG. 4, a virtual 'Q' key user interface object is selected based on a first evaluation of a plurality of eye gaze samples that have a combined location 402 that intersects the graphical user interface nearest to the 'Q' key. In response to the selection, the 'Q' key is visually distinguished from the other user interface objects, such as by highlighting, making brighter or dimmer, making larger or smaller, etc. In FIG. 4, this visual distinction is shown as cross-hatching. It is to be understood that any suitable visual feedback of the selection may be provided without departing from the scope of the present disclosure.

Further, audio feedback of the selection of the star is provided in the form of an audio clip being played that states "Q SELECTED." It is to be understood that any suitable audio feedback of the selection may be provided without departing from the scope of the present disclosure.

FIGS. 5-6 show results of an example secondary evaluation of the selection of the star UI object. In FIG. 5, the second evaluation confirms selection of the 'Q' key, as the eye gaze samples take after the selection input confirm that the combined location 402 of the eye gaze samples is nearest to the 'Q' key. In response to the confirmation of the selection, visual feedback of the confirmation of the selection of the 'Q' key is provided in the form of transitioning from the diagonal hatching to a cross hatching, but it will be understood that any suitable visual feedback may be provided. Further, audio, haptic, and/or other feedback may be provided to inform a user of the confirmation of the selection.

In contrast, FIG. 6 shows feedback provided when a second evaluation results in the de-selection of the 'Q' key and selection of the 'W' key, as the eye gaze samples taken after the selection input indicate that the combined location 402 of the eye gaze samples has moved to the 'W' key. In response to the selection of the 'W' key, the selection of the 'Q' key is undone and the highlighting is removed from the 'Q' key and placed on the 'W' key. Since the second evaluation completes the selection event, the 'W' key is cross hatched to indicate a final selection.

Figure 7A:
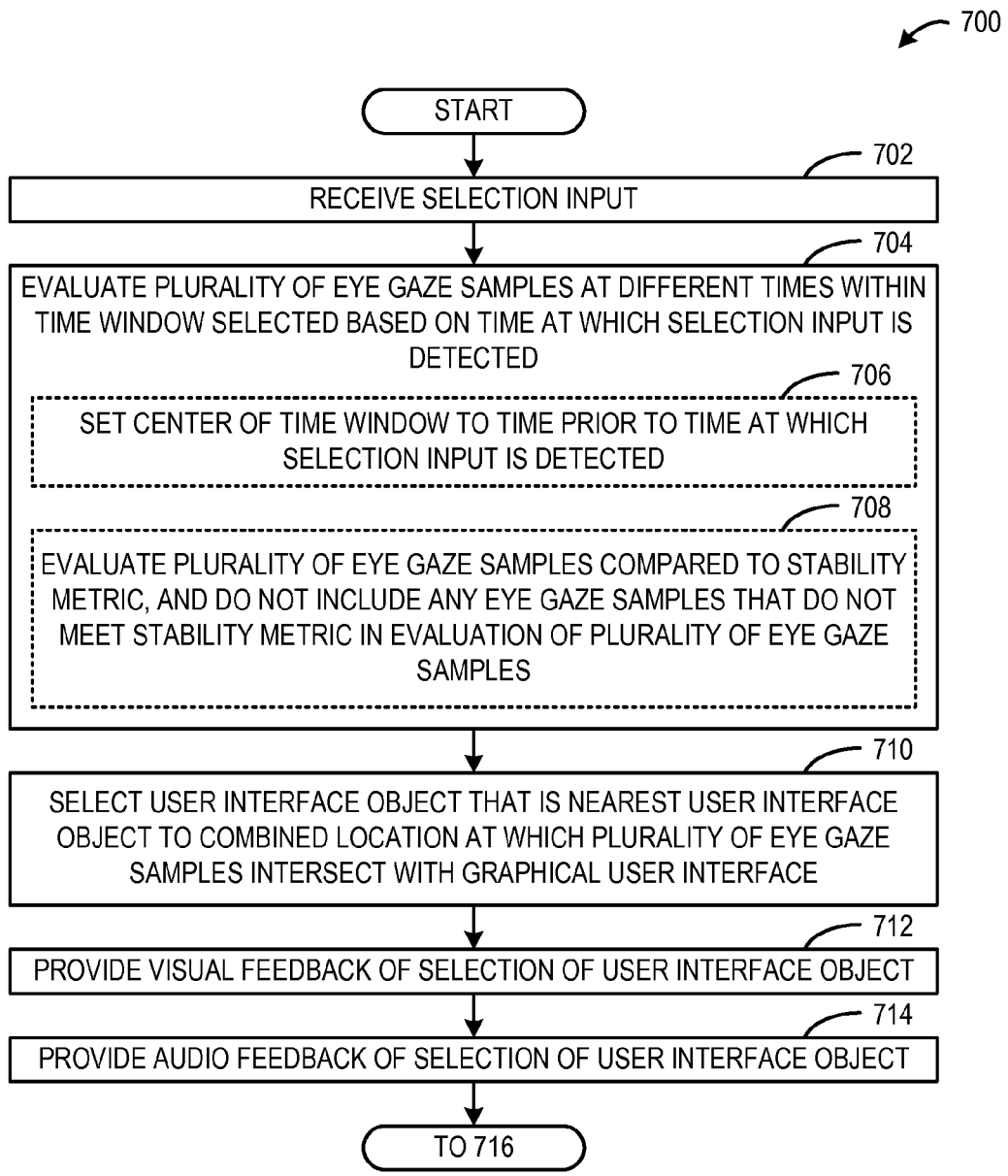
FIGS. 7A-7B show an example method for selecting a user interface object displayed on a graphical user interface based on eye gaze evaluation in accordance with an embodiment of the present disclosure.
Figure 7B:
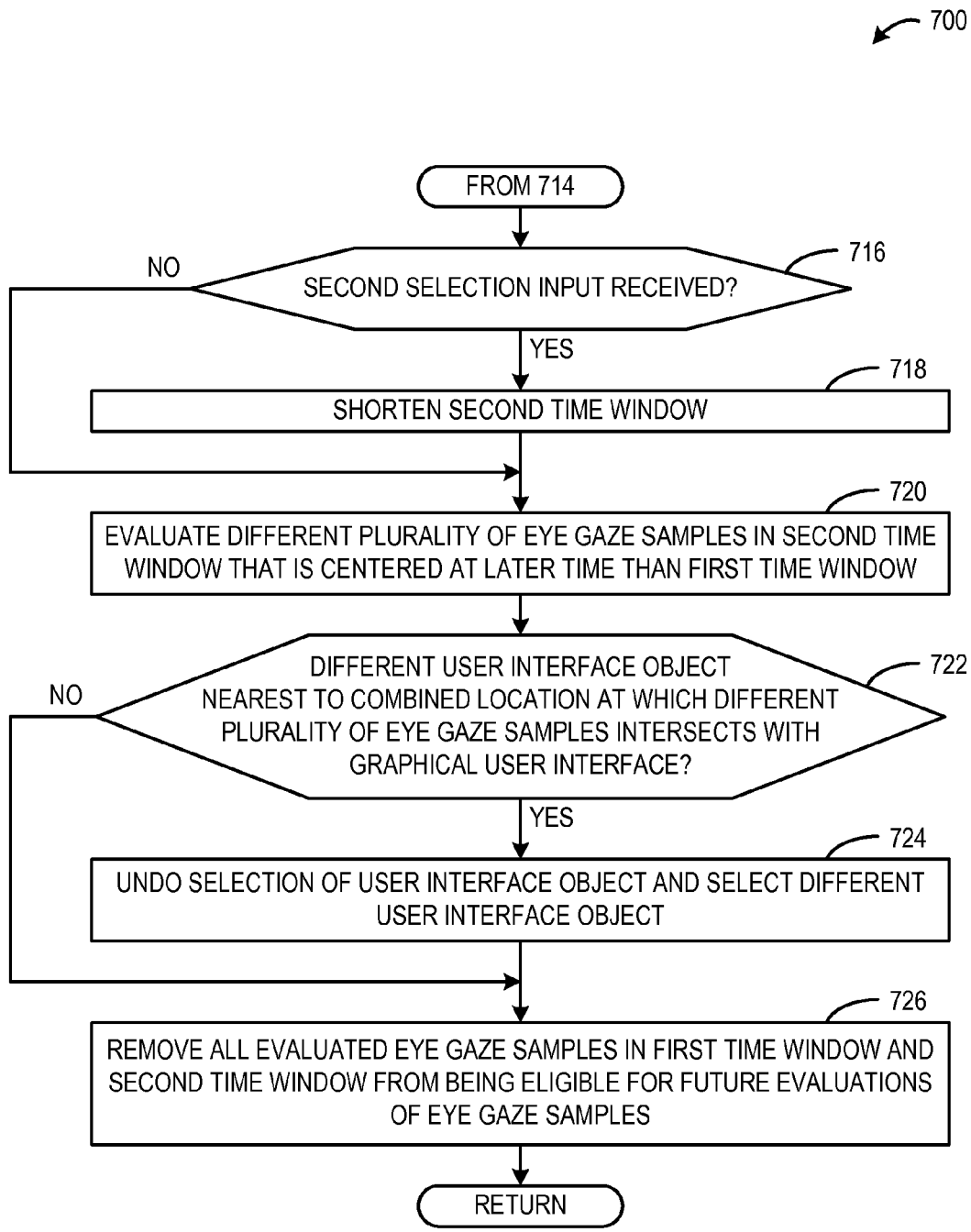

FIGS. 7A-7B show an example method 700 for selecting a UI object displayed on a graphical user interface based on eye gaze evaluation in accordance with an embodiment of the present disclosure. Method 700 may be performed, for example, by the HMD device 100 shown in FIG. 1, or by any other suitable computing device comprising an eye tracking system.

At 702, method 700 includes receiving a selection input. In some embodiments, the selection input may be received via an input mode other than eye gaze. Examples include, but are not limited to, actuation of physical buttons or other user interface devices, user gestures detected by data from image sensors and/or other motion sensors, audio data (e.g. speech data), etc.

At 704, method 700 includes evaluating a plurality of eye gaze samples at different times within a time window selected based on a time at which the selection input is detected. In some embodiments, as indicated at 706, method 700 may include setting a center of the time window to a time prior to detection of the selection input. For example, the center of the time window may be set to compensate for timing discrepancies between eye gaze and selection input as well as system latency. Further, in some embodiments, as indicated at 708, method 700 may include evaluating the plurality of eye gaze samples compared to a stability metric. Any eye gaze samples that do not meet the stability metric may not be included in the evaluation of the plurality of eye gaze samples.

At 710, method 700 includes selecting a UI object that is a nearest UI object to a combined location at which the plurality of eye gaze samples intersect with a graphical user interface. In some embodiments, the combined location is an average location at which the plurality of eye gaze samples intersect with the graphical user interface. In other embodiments, the combined location may be determined in any other suitable manner.

Upon selecting the object, user feedback may be provided. For example, at 712, method 700 may include providing visual feedback of selection of the UI object. Further, at 714, method 700 may include providing audio feedback of selection of the UI object. It will be understood that these types of feedback are presented for the purpose of example and are not intended to be limiting in any manner.

At 716, method 700 may include determining whether a second selection input is received. If a second selection input is received, then the method 700 moves to 718. Otherwise, the method 700 moves to 720. At 718, method 700 includes shortening a second time window that includes a different plurality of eye gaze samples to be evaluated in a second evaluation of the selection input. The second time window may be shortened to allow for a time window of eye gaze samples for evaluation of the second selection input that does not overlap the time window of the second evaluation. At 720, the method 700 may include evaluating a different plurality of eye gaze samples in a second time window that is centered later than the first time window. If a second input selection has been received, then that second time window is shortened (e.g., shorter than the first time window). If a second input selection is not received, then the second time window is not shortened. This second evaluation may include eye gaze samples before and after the time at which the selection input is detected.

At 722, method 700 may include determining whether a different UI object is nearest to a location at which the different plurality of eye gaze samples intersects with the user interface. If a different UI object is nearest to a location at which the different plurality of eye gaze samples intersects with the user interface, then the method 700 moves to 724, where the UI object that was originally selected is deselected, and a different UI object is selected, and then moves to 726. Otherwise, the method 700 moves to 726 without performing the process at 724.

At 726, the method 700 may include removing all evaluated eye gaze samples in the first window and the second window from being eligible for future evaluations of eye gaze samples.

By evaluating a plurality of eye gaze samples near the time at which the selection input is detected, more data may be taken into account when determining the intended UI object than when considering a single sample. This may help determine the intended UI object even when an intended eye gaze location is not synchronized with a selection input. For example, the above described method may accurately detect selection of a UI object even when eye gaze settles on an intended UI object after the selection input is performed. Further, the above described method may accurately detect selection of a UI object even when eye gaze leaves an intended UI object prior to the selection input being performed.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
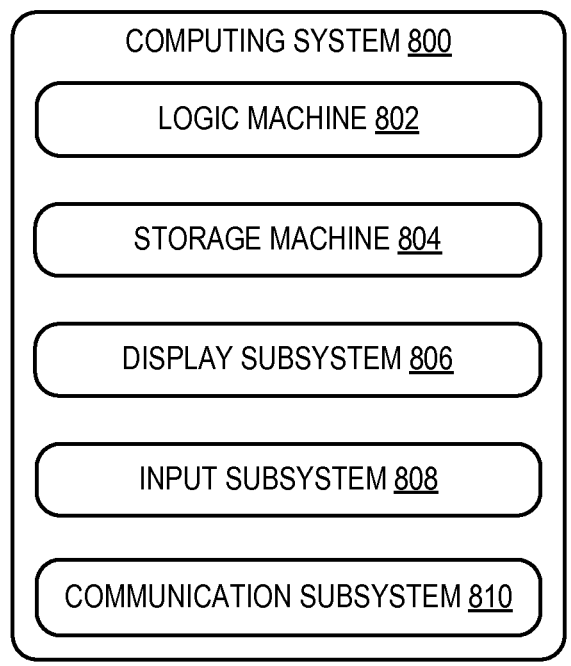
FIG. 8 schematically shows an example of a computing system in accordance with an embodiment of the present disclosure.

FIG. 8 schematically shows a non-limiting embodiment of a computing system 800 that can enact one or more of the methods and processes described above. Computing system 800 is shown in simplified form. Computing system 800 may take the form of one or more head-mounted display devices, one or more devices cooperating with a head-mounted display device, and/or any other suitable computing device that employs eye tracking as a user input mechanism. Examples include, but are not limited to, personal computers, server computers, tablet computers, home-entertainment computers, network computing devices, gaming devices, mobile computing devices, mobile communication devices (e.g., smart phone), and/or other computing devices).

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold machine-readable instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.), as opposed to being stored on a storage device.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology, such as displays 102 of the HMD device 100 shown in FIG. 1. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; electric-field sensing componentry for assessing brain activity; any of the sensors described above with respect to eye gaze tracking system 108 and head tracking system 110 of FIG. 1; and/or any other suitable sensor.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device comprising an eye tracking system, a method for selecting a user interface object displayed on a graphical user interface based on eye gaze, the method comprising:
   sampling eye gaze samples via the eye tracking system;
   storing the eye gaze samples;
   detecting a selection input, via a user input mechanism other than the eye tracking system, at a time when an eye gaze location intersects a first user interface object;
   upon receipt of the selection input, evaluating a plurality of the eye gaze samples at different times within a time window selected based on the time at which the selection input is received to determine a combined location of the plurality of the eye gaze samples;
   when the combined location of the plurality of the eye gaze samples is closer to a second user interface object than the first user interface object, then selecting the second user interface object as a result of the selection input;

evaluating a different plurality of the eye gaze samples in the time window to determine a combined location of the different plurality of the eye gaze samples; and confirming the selecting of the second user interface object or selecting a different user interface object as a result of the selection input based upon the combined location of the different plurality of the eye gaze samples.

2. The method of claim 1, wherein the second user interface object is selected based on having a highest weighting according to a selection rule.

3. The method of claim 1, wherein the time window includes eye gaze samples taken before and after the time at which the selection input is received, and wherein the method further comprises selecting the first user interface object when the combined location of the plurality of the eye gaze samples is closer to the first user interface object than the second user interface object.

4. The method of claim 1, further comprising:
setting a center of the time window to a different time that is prior to the time at which the selection input is received.

5. The method of claim 1, further comprising:
evaluating the plurality of the eye gaze samples compared to a stability metric, and not including any eye gaze samples that do not meet the stability metric in evaluating the plurality of the eye gaze samples.

6. The method of claim 1, further comprising:
in response to selecting the second user interface object, providing visual feedback of the selecting of the second user interface object on the graphical user interface.

7. The method of claim 1, wherein the time window is a first time window, wherein selecting the different user interface object comprises
selecting the different user interface object if the different user interface object is nearest to the combined location of the different plurality of the eye gaze samples, and undoing the selecting of the second user interface object.

8. The method of claim 7, further comprising:
upon evaluation of the different plurality of eye gaze samples in the second time window, removing evaluated eye gaze samples in the first time window and the second time window from being eligible for future evaluations of eye gaze samples.

9. The method of claim 7, wherein the selection input is a first selection input, the method further comprising:
receiving a second selection input after the first selection input is received; and
if the second selection input is detected before the different plurality of the eye gaze samples are evaluated, then shortening the second time window.

10. A data-holding device, comprising an eye tracking system, holding instructions executable by a logic device to:
sample eye gaze samples via the eye tracking system;
store the eye gaze samples;
detect a selection input made via a user input mechanism other than the eye tracking system, at a time when an eye gaze location intersects a first user interface object;
upon receipt of the selection input, evaluate a plurality of the eye gaze samples at different eye gaze locations and at different times within a time window selected based on the time at which the selection input is detected to determine a combined location of the plurality of the eye gaze samples;
when the combined location of the plurality of the eye gaze samples is closer to a second user interface object than the first user interface object, then select the second user interface object as a result of the selection input and based on the second user interface object having a highest weighting according to a selection rule;

evaluate a different plurality of the eye gaze samples in the time window to determine a combined location of the different plurality of the eye gaze samples; and confirm the selecting of the second user interface object or select a different user interface object as a result of the selection input based upon the combined location of the different plurality of gaze samples.

11. The data-holding device of claim 10, wherein the highest weighting is assigned to a user interface object that is a nearest user interface object to the combined location at which the plurality of the eye gaze samples intersect with a graphical user interface, the nearest user interface object being the first user interface object when the combined location is closer to the first user interface object than the second user interface object.

12. The data-holding device of claim 10, wherein the time window includes eye gaze samples taken before and after the time at which the selection input is detected.

13. The data-holding device of claim 10, further holding instructions executable by the logic device to:
set a center of the time window to a different time prior to the time at which the selection input is detected.

14. The data-holding device of claim 10, further holding instructions executable by the logic device to:
evaluate the plurality of the eye gaze samples compared to a stability metric, and not include any eye gaze samples that do not meet the stability metric in evaluating the plurality of the eye gaze samples.

15. The data-holding device of claim 10, further holding instructions executable by the logic device to:
in response to selecting the second user interface object, provide visual feedback of selection of the second user interface object on the graphical user interface.

16. The data-holding device of claim 10, wherein the time window is a first time window, and the data-holding device further holds instructions executable by the logic device to:
after the second user interface object is selected, evaluate a different plurality of the eye gaze samples in a second time window that is centered later than the first time window to determine the combined location of the different plurality of the eye gaze samples; and
if the different user interface object is nearest to the combined location of the different plurality of the eye gaze samples, then undo the selecting of the second user interface object and select the different user interface object.

17. The data-holding device of claim 16, further holding instructions executable by the logic device to:
upon evaluation of the different plurality of the eye gaze samples, remove evaluated eye gaze samples in the first time window and the second time window from being eligible for future evaluations of eye gaze samples.

18. The data-holding device of claim 16, wherein the selection input is a first selection input, and the data-holding device further holds instructions executable by the logic device to:
detect a second selection input after the time at which the first selection input is detected;
if the second selection input is detected before the different plurality of the eye gaze samples are evaluated, then shorten the second time window.

19. A head-mounted display device, comprising:
a display configured to display a graphical user interface including one or more user interface objects;
an eye tracking system configured to detect a location at which an eye gaze of a wearer of the head-mounted display device intersects with the display;
a logic device; and
a data-holding device holding instructions executable by the logic device to:
sample eye gaze samples via the eye tracking system;
store the eye gaze samples;
detect a selection input made via a user input mechanism other than the eye tracking system, at a time when an eye gaze location intersects a first user interface object,
upon receipt of the selection input, evaluate a plurality of the eye gaze samples at different eye gaze locations and at different times within a time window selected based on the time at which the selection input is detected to determine a combined location of the plurality of the eye gaze samples, and
when the combined location of the plurality of the eye gaze samples is closer to a second user interface object than the first user interface object, then select the second user interface object as a result of the selection input;
evaluate a different plurality of the eye gaze samples in the designated time window to determine a combined location of the different plurality of the eye gaze samples; and
confirm the selecting of the second user interface object or select a different user interface object as a result of the selection input based upon the combined location of the different plurality of eye gaze samples.

20. The head-mounted display device of claim 19, wherein the time window includes eye gaze samples taken before and after the time at which the selection input is detected, and wherein the first user interface object is selected when the combined location of the plurality of the gaze samples is closer to the first user interface object than the second user interface object.

* * * * *